United States Patent
Mullen et al.

(10) Patent No.: US 6,560,649 B1
(45) Date of Patent: May 6, 2003

(54) HIERARCHICAL SERVICE LEVEL REMEDIATION FOR COMPETING CLASSES BASED UPON ACHIEVEMENT OF SERVICE LEVEL GOALS

(75) Inventors: David C. Mullen, Newcastle; Joyce A. Clippinger, Woodinville, both of WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/248,047

(22) Filed: Feb. 10, 1999

(51) Int. Cl.[7] ............................................. G06F 15/173
(52) U.S. Cl. ...................................... 709/226; 709/223
(58) Field of Search .................................. 709/201, 202, 709/203, 204

(56) References Cited

U.S. PATENT DOCUMENTS

| | | | | |
|---|---|---|---|---|
| 5,537,542 A | * | 7/1996 | Eilert et al. ................... | 709/201 |
| 5,838,968 A | * | 11/1998 | Culbert ........................ | 395/674 |
| 5,974,462 A | * | 10/1999 | Aman et al. ................... | 703/225 |
| 6,154,769 A | * | 11/2000 | Cherkasova et al. ......... | 709/207 |
| 6,178,441 B1 | * | 1/2001 | Elnozahy ...................... | 709/203 |
| 6,226,377 B1 | * | 5/2001 | Donaghue, Jr. .............. | 379/265 |
| 6,230,183 B1 | * | 5/2001 | Yocum et al. ................ | 703/105 |
| 6,263,359 B1 | * | 7/2001 | Fong et al. ................... | 709/103 |
| 6,272,544 B1 | * | 8/2001 | Mullen ........................ | 703/226 |

FOREIGN PATENT DOCUMENTS

| | | | | |
|---|---|---|---|---|
| CA | 2143198 | 1/1995 | ............ | H04Q/7/22 |
| WO | PCT/US95/08080 | 3/1996 | ............ | G06F/13/00 |
| WO | PCT/SE98/01074 | 12/1998 | ............ | H04Q/7/38 |

* cited by examiner

*Primary Examiner*—Glenton B. Burgess
*Assistant Examiner*—Kenneth W. Fields
(74) *Attorney, Agent, or Firm*—Sheridan Ross P.C.

(57) ABSTRACT

Hierarchical remediation on the unmet service needs associated with work items queued in a work processing facility is used in order to maximize the achievement of service level goals. A hierarchical remediator and corresponding hierarchical remediation method may each be employed in a work distributor or an automatic call distributor ("ACD"). The hierarchical remediator determines which work item among pending work items of different types will be distributed to an available server. The hierarchical remediator and its corresponding hierarchical remediation method ensure that more important jeopardized service levels receive greater remedial compensation than the less important ones. The hierarchy of distinct service classes associated with jeopardized service levels may comprise one input to the hierarchical remediator. The hierarchical remediator may also consider a skill preference profile for the available server as another input. The hierarchical remediator generates a composite preference value for each alternate work item from among the work items queued in the work processing facility. The hierarchical remediator selects which work item to assign to the available server by identifying the work item having the highest composite preference value. The hierarchical remediator and the corresponding hierarchical remediation method may be directed to apply one of a variety of user-supplied functions in order to complete the calculations associated with the composite preference values.

74 Claims, 10 Drawing Sheets

| WORK TYPE | SERVICE CLASS | GOAL CRITERION | DESIRED SERVICE LEVEL | PRIORITY LEVEL |
|---|---|---|---|---|
| CLAIMS CALLS FROM PREFERRED CUSTOMERS | CALL FROM PREFERRED CUSTOMERS | NOT ABANDONED | 95%, MEASURED OVER EACH DAY | 3 |
| | CLAIMS CALLS | ANSWERED WITHIN 60 SECONDS | 85% | 6 |
| | FULFILLMENT PROCESSING TRANSACTIONS | COMPLETED BY THE END OF THE NEXT BUSINESS DAY | 90% | 7 |

| WORK TYPE | SERVICE CLASS | GOAL CRITERION | DESIRED SERVICE LEVEL | PRIORITY LEVEL |
|---|---|---|---|---|
| QUOTE REQUESTS | CALL FROM PROSPECT | NOT ABANDONED, BEFORE BEING CONNECTED TO AGENT | 98%, MEASURED OVER EACH WEEK | 1 |
| | TARGET PROSPECTS' PROCESSING | COMPLETED THE SAME DAY | 75% | 2 |
| | CALL FROM PROSPECT | ANSWERED WITHIN 15 SECONDS | 95% | 5 |

FIG. 2

| PREFERENCE LEVEL | SERVICE CLASS |
|---|---|
| 3 | CALLS FROM PROSPECTS |
| 2 | CALLS FROM PREFERRED CUSTOMERS |
| 1 | FULFILLMENT PROCESSING |

| 401 | 402 | 403 | 404 |
|---|---|---|---|
| SERVER ID | WORK TYPE | SERVER PREFERENCE FOR WORK TYPE | SERVER THRESHOLD FOR WORK TYPE |
| 100 | COMPLAINT CALLS | 8 | 9 |
| 100 | CLAIMS CALLS FROM PREFERRED CUSTOMERS | 8 | 3 |
| 100 | QUOTE REQUESTS | 2 | 4 |
| 101 | COMPLAINT CALLS | 5 | 9 |
| 101 | CLAIMS CALLS FROM PREFERRED CUSTOMERS | 6 | 7 |
| 101 | QUOTE REQUESTS | 0 | 0 |

| PRIORITY LEVEL 511 | SERVICE CLASS 512 | GOAL CRITERION 513 | SERVICE LEVEL GOALS DESIRED SERVICE LEVEL 514 | ATTAINED SERVICE LEVEL 515 | UNSATISFIED 516 | |
|---|---|---|---|---|---|---|
| 1 | CALLS FROM PROSPECTS | NOT ABANDONED BEFORE BEING CONNECTED TO AN AGENT | 98%, MEASURED OVER EACH WEEK | 95% | YES | ~501 |
| 2 | TARGET PROSPECTS' PROCESSING | COMPLETED THE SAME DAY | 75% | 79% | | ~502 |
| 3 | CALLS FROM PREFERRED CUSTOMERS | NOT ABANDONED | 95%, MEASURED OVER EACH DAY | 92% | YES | ~503 |
| 4 | CALLS FROM PREFERRED CUSTOMERS | ANSWERED WITHIN 12 SECONDS | 85%, MEASURED OVER EACH DAY | 83% | YES | ~504 |
| 5 | CALLS FROM PROSPECTS | ANSWERED WITHIN 15 SECONDS | 95% | 89% | YES | ~505 |
| 6 | CLAIMS CALLS | ANSWERED WITHIN 60 SECONDS | 85% | 85% | | ~506 |
| 7 | FULFILLMENT PROCESSING | COMPLETED BY THE END OF THE NEXT BUSINESS DAY | 90% | 55% | YES | ~507 |
| 8 | FULFILLMENT PROCESSING FOR PROSPECTS | COMPLETED WITHIN 24 HOURS | 85% | 92% | | ~508 |

HIERARCHICAL SERVICE LEVEL REMEDIATION FOR COMPETING CLASSES BASED UPON ACHIEVEMENT OF SERVICE LEVEL GOALS

TECHNICAL FIELD

The present invention is directed to the field of service provider allocation.

BACKGROUND OF THE INVENTION

Many service organizations need to dynamically allocate their servers in order to attain certain goals. Such allocation is typically performed manually. Servers may include service agents, both human and robotic. Increasingly, external performance measures of service delivered dominate internal cost measures, such as utilization and labor costs. Such external measures often consist of classifying certain transactions into meeting or not meeting desired objectives and determining a proportion of those transactions that meet objectives. Such a proportion is called a service level. The service level is measured over some period of time or over some number of transactions.

Examples of service levels are the percentage of customer problems resolved without further activity, the percentage of dispatched taxicabs that reach the rider within the committed time, the proportion of telephone calls handled by a qualified representative without requiring a transfer or referral to another server, the proportion of telephone calls that can be connected to a server without delay, the proportion of e-mail requests that are answered within 24 hours, the percentage of on-time departures of city buses on a particular bus route on weekdays, the proportion of transactions handled not resulting in a customer complaint, the proportion of preferred customer calls handled by fully qualified servers, the percentage of Spanish customers handled by a server fluent in Spanish, the percentage of telephone calls not abandoned by the customer before connection to a server, the percentage of customer inquiry telephone calls that are not blocked at the central office switch, the percentage of customer sessions with the self-service World Wide Web pages that are not aborted while waiting for a display, the percentage of customer requests via telephone that can be completed immediately while on the phone, the percentage of loan applications processed within one-half hour from the time of the request, and the percentage of priority telephone calls answered within 8 seconds and handled properly by a qualified server, to name a few.

A service organization's goal for a service level in this context is a particular desired value of the service level. The goal is said to be satisfied if the attained service level is at least as high as the desired service level for the goal. Conversely, the goal is said to be unattained if the realized service level is less than the desired service level. For example, the goal of at least 85% of telephone calls from preferred customers each day being answered within 12 seconds would be attained if, among the telephone calls from preferred customers during the current day, 87% were answered within 12 seconds; inversely, if only 84% of such calls are answered within 12 seconds, the goal would be unattained. In this framework the goal is either attained or not. Moreover, no extra benefit is assumed to accrue for attaining a service level much higher than the goal.

The number of server resources allocated to a type of service often affects the service level achieved for that type of service. When such is the case, the operation can usually reallocate servers to the subject work in order to achieve service level goals. Such reallocation generally incurs opportunity cost; however, since service levels for other work suffer. One can often justify this opportunity cost based on an appropriate priority hierarchy.

For example, suppose servers in a call center can handle both loan servicing and sales servicing transactions. When more servers are assigned to sales activities, sales servicing transactions experience a higher service level on answer delay—that is, the amount of time required to answer each sales call declines. Meanwhile, the loan servicing calls are not answered as promptly, reducing the service level for loan servicing transactions. The service organization may rationalize this by saying that loan servicing is relatively less important because it is not very likely that an existing customer will switch loan companies, and that the company presently needs to acquire new customers that could easily take their business to a competitor if their calls are not answered promptly. The service organization wants to satisfy the goal of loan servicing, but not at the expense of failing to reach the goal in sales. When the sales goal is not in jeopardy, but the loan servicing is failing to meet its goal, the service organization desires to allocate more resources to loan servicing. The service organization wants to meet both goals, but the sales goal is more important than the loan servicing goal and so may preempt it. That is, if the operation can only meet one goal it should be the sales goal.

The desire to allocate more server resources to some activity is typically contingent upon the alternative activities that the server resources can perform and the demand for such alternative activities. Each of these alternative activities is also potentially associated with various service levels, each of which has a goal and a level of attainment. So the reallocation of resources can depend upon service measures for all alternative work associated with each of the resources. Manually performing such a potentially complex allocation function can produce significantly sub-optimal results. Often the manual allocation is too late and leads to more problems when the reallocated servers are not returned to their preferred work soon enough.

The advent of skills-based routing, in which the skills of each individual server are considered in allocating servers, complicates the situation. This approach cannot tolerate simplifying fragmentation of resources into monolithic pools where distinguishing skills are ignored. For this reason, conventional automatic call distributors ("ACDs") fail to meet this need. ACDs may force users to manipulate server "skills" in order to effect a reallocation of servers, and the ACD may report "service levels" only on skill demands or on some kind of queuing point on a distribution map. However, sometimes a "skill" is actually a type of work instead of an attribute of the server's capabilities. These conventional solutions constitute potentially severe limitations on the monitoring and control of service levels important to the service organization.

In this environment, the service organization wants to provide preferential treatment to work activities in a hierarchy that ensures that the best work item is given to a server in view of attained service levels and the stated priorities of service level goals. An automated system that dynamically assigned available servers to queued work items based on the attainment or non-attainment of service levels for the service goals pertaining to queued work items would have significant utility.

SUMMARY OF THE INVENTION

The present invention provides hierarchical remediation on the unmet service needs associated with work items queued in a work processing facility in order to maximize the achievement of service level goals. A hierarchical remediator and corresponding hierarchical remediation method may each be employed in a work distributor, an automatic call distributor ("ACD"), or a similar facility.

The hierarchical remediator typically performs its tasks when a server becomes available for work and when work items of more than one work type are queued pending distribution. The hierarchical remediator determines which work item of the queued work items will be distributed to the available server. The hierarchical remediator may select a work item from among other queued work items on the basis of a composite preference value for the work item, according to an embodiment of the invention. The hierarchical remediator and its corresponding hierarchical remediation method ensure that more important jeopardized service levels receive greater remedial compensation than the less important ones.

The hierarchy of distinct service classes associated with jeopardized service levels may comprise one input to the hierarchical remediator, according to an embodiment of the invention. The hierarchical remediator locates preference values associated with the service classes that are monotonic with respect to their position in the hierarchy. A service class is the part of the service level goal that defines the set of transactions that apply to the goal. The hierarchical remediator may also consider a skill preference profile for the available server as another input, according to an embodiment of the invention. The hierarchical remediator generates a composite preference value for each alternative work item from among the work items queued in the work processing facility, according to an embodiment of the invention. The hierarchical remediator selects which work item to distribute to the available server by identifying the work item having the highest composite preference value.

Embodiments of the hierarchical remediator and the corresponding hierarchical remediation method may be directed to apply a variety of user-supplied functions in order to perform the calculations associated with the composite preference values.

The hierarchical remediator allows a work processing facility to control service performance largely without consideration of the organization of the servers, the organization of the work, or the profiles of the servers. The hierarchical remediator dynamically biases the assignment of servers to improve service performance in various targeted service classes.

BRIEF DESCRIPTION OF THE DRAWINGS

An embodiment of the invention will be described below relative to the following figures. Note that similar elements and steps in the figures have the same reference number.

FIG. 2 is a table diagram illustrating work item characteristics for two work items 220, 225 pending in a work queue 230, according to an embodiment of the invention.

FIG. 4 is a server preference table 400 illustrating the preferences of various servers for the various work types 215 performed for the service organization, according to an embodiment of the invention.

FIG. 5 is a diagram illustrating a table 500 of unsatisfied service level goals identified by the facility from among a sample set of service level goals, according to an embodiment of the invention.

DETAILED DESCRIPTION OF THE INVENTION

Figure 1:
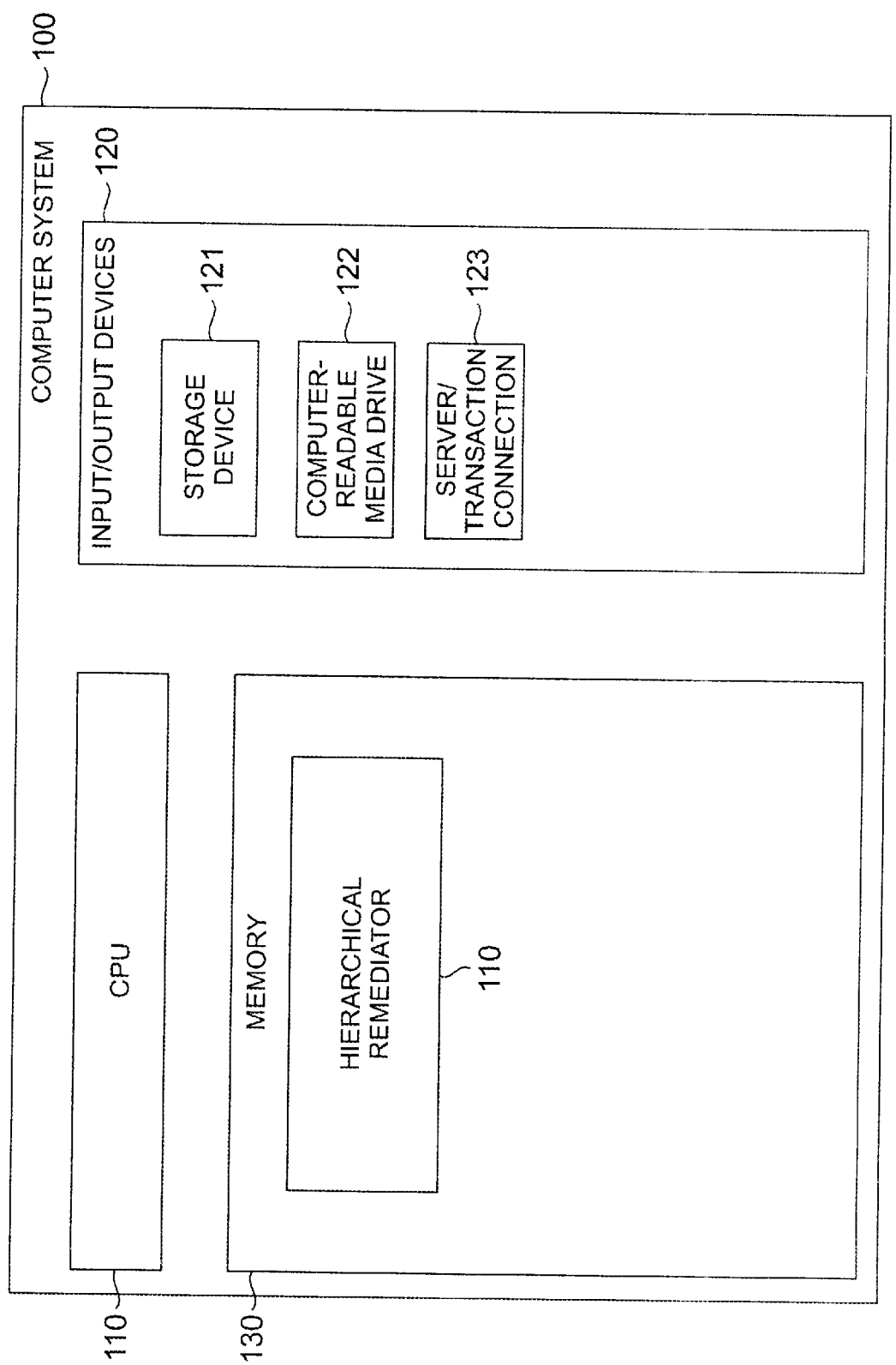
FIG. 1 is a high-level block diagram of a sample general-purpose computer system 100 upon which a hierarchical remediator 102 may execute, according to an embodiment of the invention.

The present invention provides a facility for performing hierarchical remediation of the unmet service needs associated with work items queued in a work processing facility in order to maximize the achievement of service level goals. A hierarchical remediator and a corresponding hierarchical remediation method provided by the invention might each be employed in a work distributor or an automatic call distributor ("ACD"), according to an embodiment of the invention. The hierarchical remediator typically performs its tasks when a server becomes available for work in the work processing facility and when work items of more than one work type are queued pending distribution. The hierarchical remediator determines which work item is chosen for immediate servicing by the available server. Likewise, the corresponding hierarchical remediation method effects a hierarchical remediation of service levels. That is, more important jeopardized service levels receive greater remedial compensation than less important ones.

One input to the hierarchical remediator may be the hierarchy of distinct service classes associated with jeopardized service levels. The hierarchical remediator locates preference values associated with the service classes that are monotonic with respect to their position in the hierarchy. A service class is the part of the service level goal that defines the set of transactions that apply to the goal. The desired service level and the criteria for classifying the service into good or bad are not part of the service class. For example, assume an operation has the goal of processing 80% of the e-mail inquiries from premium prospects within 6 hours. The "e-mail inquiries from premium prospects" is the service class that pertains to the goal. Whether or not a server processes an inquiry within 6 hours does not affect membership in the service class, and the 80% goal value is not part of the definition of the service class.

The relationship between work types and service classes is frequently complicated and is certainly not trivial. Service classes are not necessarily mutually exclusive, nor are they necessarily collectively inclusive. Work types typically relate to the tasks performed by a server with regard to a work item. Service classes may be defined by attributes not related to server skills or they may be defined by the same attributes that define server skills. Additionally, more than one goal may pertain to a service class.

The hierarchical remediator may also receive a skill preference profile for the available server as another input. The servers in the work processing facility may comprise both human and robotic agents. Each server may have a preference value for each type of work that he can perform. In the absence of the hierarchical remediator, a server typically receives the work for which he has the highest preference value.

The hierarchical remediator generates a composite preference value for each alternative work item from among the work items queued in the work processing facility. The hierarchical remediator may apply any user-supplied composite preference value function or may apply a default composite preference value function. The composite preference value function may be any of myriad functions of the service class preference value and the server's preference value for the work type, according to an embodiment of the invention. However, the user-supplied composite preference value function should be strictly monotonically increasing with respect to both the service class preference value and the server preference value, according to a preferred embodiment of the invention. A simple composite preference value function merely sums the server's preference value for the work item and the preference value of a service class incorporating the work item. Work items for which the server is basically unqualified (without a preference value) receive no preference value regardless of the preference values of the associated service classes, in a preferred embodiment of the invention. The hierarchical remediator then selects which queued work item to assign to the server by identifying the work item having the highest composite preference value.

The hierarchical remediator may determine the service class preference value of a work item as a function of the preference values of the service classes to which the work item belongs. The service class preference value function should be monotonically increasing with respect to the preference values of all the service classes, according to a preferred embodiment of the invention. One simple service class preference value function comprises determining the maximum of the preference values of the service classes, and another simple service class preference value function comprises determining the sum of the preference values of the service classes for the work item. A skilled artisan may readily recognize other suitable functions for determining the service class preference value.

The hierarchical remediator systematically applies dynamic work priorities to maximize goal attainment among the goals in a hierarchy of goals. The hierarchical remediator ensures that a higher priority jeopardized goal receives commensurately more compensation than jeopardized goals of lower priority.

The hierarchical remediator allows a work processing facility to control service performance largely without consideration of the organization of the servers, the organization of the work, or the profiles of the servers. Furthermore, such performance specifications are invariant with time. The hierarchical remediator dynamically biases the assignment of servers to improve service performance in various targeted service classes. The hierarchical remediator can help eliminate manual intervention to reallocate servers. As previously discussed, manual dispatching of servers is often too late and leads to more problems when the reallocated servers do not return to their preferred work soon enough. The hierarchical remediator should improve customer service while also reducing the burden of supervision and control of operations.

The hierarchical remediator associated with a work distributor or ACD biases the distribution of work to servers. Without the operation of a hierarchical remediator, the work distributor or ACD can still function, but without control for goal attainment. In a machine using the hierarchical remediator, the work distributor or ACD adapts to realized service levels in order to reach the associated goals.

For example, in a situation in which a work distributor would normally assign a server to transactions of a first service class, in the presence of the hierarchical remediator, the work distributor will assign the server to transactions of a second service class when the composite preference value of the second service class exceeds the composite preference value of the first service class. The service class priorities only affect work distribution in a marginal sense. For example, a high preference value for a service class will still not render a server available for work for which he is totally unqualified. When no goals are in jeopardy, the hierarchical remediator may assign a preference value of zero for all service classes. In this case, the work distributor matches servers with work using only server preferences for work types. Actually, the composite preference values for work items are identical to the server preference values for the work items.

The hierarchical remediator benefits the overall level of customer service and reduces the burden of supervision and control of operations. The hierarchical remediator enables a machine to dynamically change the assignment of agents or other servers. The hierarchical remediator starkly contrasts with the conventional industry practice of manual intervention to reallocate servers based on realized results. As noted above, manual dispatching is often too late and leads to more problems when the reallocated servers are not returned to their preferred work soon enough.

FIG. 1 is a high-level block diagram of a sample general-purpose computer system 100 upon which a hierarchical remediator 102 may execute, according to an embodiment of the invention. The computer system 100 may be contained within a work processing facility, according to an embodiment of the invention. In another embodiment of the invention, the work processing facility may itself be contained within the computer system 100. The computer system 100 contains a central processing unit (CPU) 110, input/output devices 120, and a computer memory (memory) 130. Among the input/output devices is a storage device 121, such as a hard disk drive, and a computer-readable media drive 122, which can be used to install software products, including embodiments of the hierarchical remediator 102, which are provided on a computer-readable medium, such as a CD-ROM. The input/output devices 120 further include a connection 123 to servers and transaction sources from which transactions are received. For example, the connection 123 may be used to connect the computer system to one or more computer telephony interfaces, World Wide Web servers, or World Wide Web browsers. This connection is usable by the hierarchical remediator 102 to detect server availability, assign servers to applications and transactions, and monitor the processing of transactions by servers. The memory 130 preferably contains the hierarchical remediator 102.

While the hierarchical remediator 102 is preferably implemented on a computer system configured as described above, those skilled in the art will recognize that it may also be implemented on computer systems having different configurations. For example, the hierarchical remediator 102 may be implemented on a computer system having different components than described above. The hierarchical remediator 102 may also be implemented on special-purpose computing systems, such as those in a call center. The hierarchical remediator 102 may further be implemented without software in special-purpose hardware, using, for example, application-specific integrated circuits ("ASICs"). An automatic call distributor ("ACD") in a call center may also include the hierarchical remediator 102 as part of its functionality.

In order to more fully describe the details of the hierarchical remediator 102, its operation in conjunction with a specific example is discussed hereafter. This example is designed to provide a convenient basis for discussing the operation of the hierarchical remediator 102, and therefore is not necessarily representative in all senses of a typical application of the hierarchical remediator 102. Indeed, those skilled in the art will recognize that the hierarchical remediator 102 may be applied to scenarios that are both more extensive and diverse than the scenario portrayed in the example.

FIG. 2 is a table diagram illustrating work item characteristics for two work items 220, 225 pending in a work queue 230, according to an embodiment of the invention. Each arriving work item in the work queue 230 is characterized by a work type, and additionally has characteristics that can be associated with one or more service level goals. Service level goals reflect the objectives to be met by the customer service organization associated with the work processing facility, and a service level goals table for the entire organization may be established by a system administrator or a service manager. As is discussed in greater detail below, the work processing facility uses the contents of the service level goals table to assign preference values to service classes.

The work items 220, 225 may be characterized in part according to a work type 215a, 215b, according to an embodiment of the invention. The work type 215a, 215b typically represents a broad classification for a work item, generally related to tasks performed by a server. The work type 215a is "claims calls from preferred customers" while the work type 215b is "quote requests." The work items 220, 225 may also be characterized according to the organization's service level goals and service level goal characteristics. Each goal has a priority level 211a,b. A goal's priority level reflects the desirability of satisfying that goal relative to the desirability of satisfying the other goals from the service organization's viewpoint. For example, because the goal for a work item characteristic 201 has a priority level "3," it is more desirable to satisfy the goal for the work item characteristic 201 than to satisfy the goal for a work item characteristic 202, while it is more desirable to satisfy the goal for the work item characteristic 202 than the goal for a work item characteristic 203. Each goal established by the organization administering the work processing facility preferably has a different priority level, such that, for n goals, priority levels 1 through n are assigned.

Each goal also has a corresponding service class 212a,b. The service class identifies the transactions to which a goal applies. For example, it can be seen from the service class of the work item characteristic 203 that the work item characteristic 203 applies to fulfillment processing transactions. It can further be seen from the service class of a work item characteristic 204 that the work item characteristic 204 applies to calls from prospects.

Each goal further has a goal criterion 213a,b that indicates the standard applied to determine whether a single transaction within the service class of the goal satisfies the goal. For example, it can be seen from a work item characteristic 206 that the corresponding goal to be satisfied by a particular call transaction from a prospect is that the call is answered within 15 seconds.

Each goal further includes a desired service level 214a,b. The desired service level 214a,b indicates the minimum percentage of transactions within the goal's service class for which the goal criterion 213a,b must be achieved in order for the goal to be considered satisfied. For example, it can be seen from the desired service level 214a of the work item characteristic 202 that in order for the goal 213a to be satisfied, at least 85% of the claims calls be answered within 60 seconds. Because the goal criterion and desired service level together specify a sought level of performance with respect to transactions in the goal's service class, the goal criterion and desired service level are said to comprise a "performance standard."

Figure 3A:
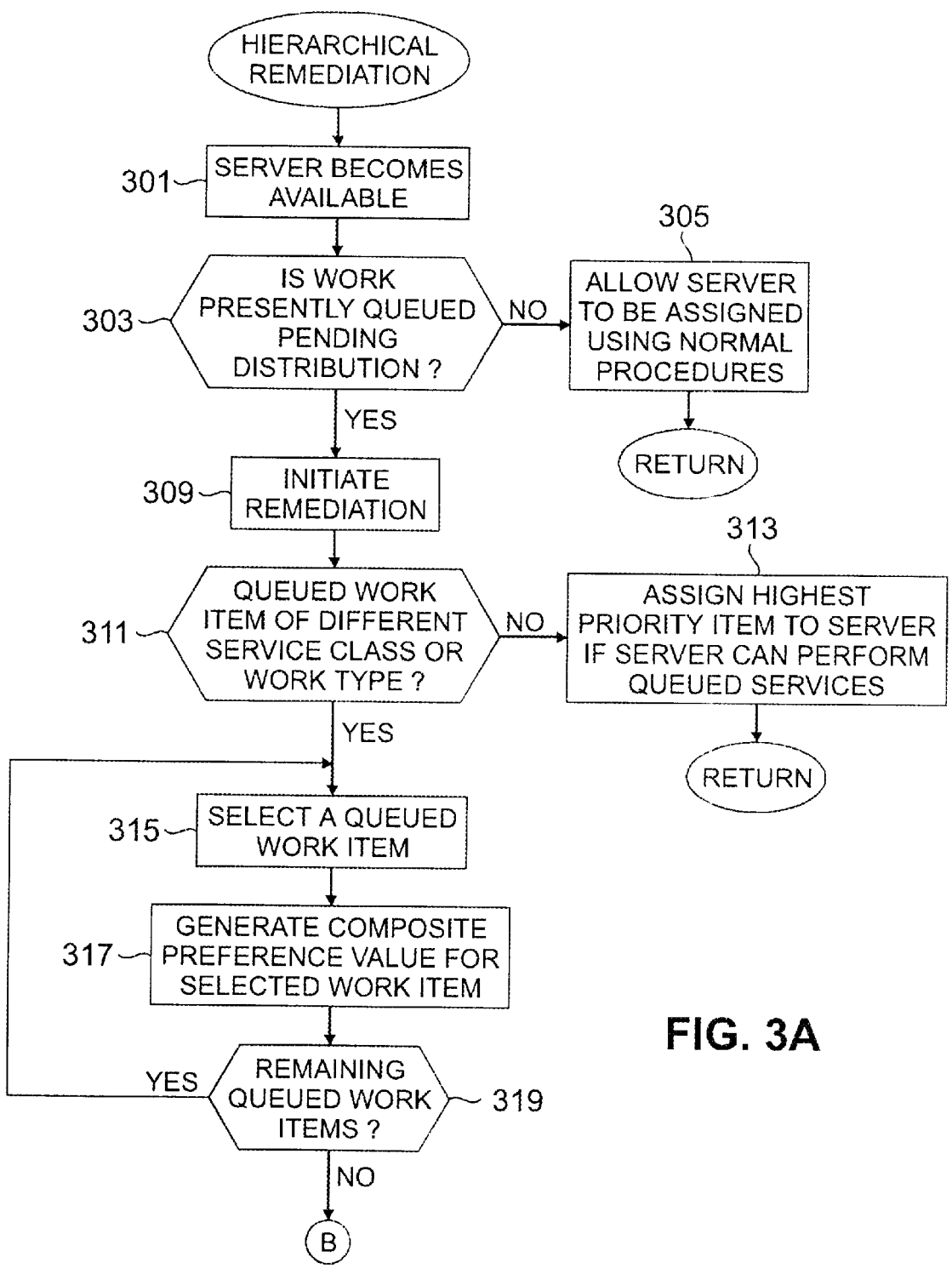
FIGS. 3A and 3B are a flowchart illustrating an exemplary hierarchical remediation procedure, according to an embodiment of the invention.
Figures 3B, 6:
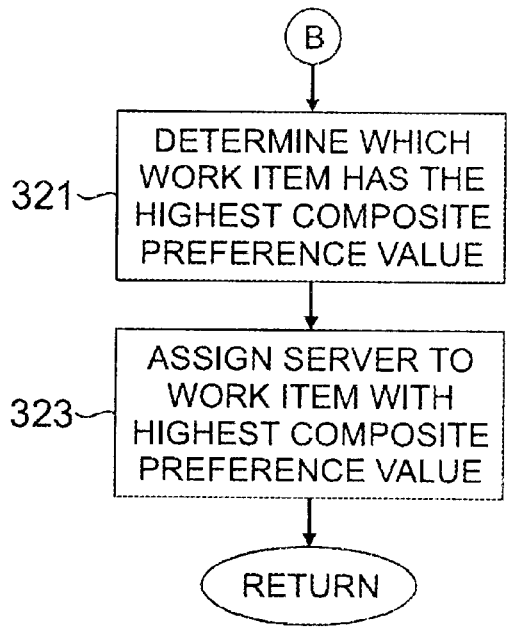
FIG. 6 is a diagram of a table 600 illustrating the assignment of preference levels to service classes, according to an embodiment of the invention.

FIGS. 3A and 3B are a flowchart illustrating an exemplary hierarchical remediation procedure, according to an embodiment of the invention. The hierarchical remediator 102 becomes aware that a server has become available (step 301). The hierarchical remediator 102 determines whether work items have been queued (step 303). If work items have not been queued (step 303), then the hierarchical remediator 102 allows the available server to be assigned using normal procedures for the work processing facility (step 305). Typically, the server waits for the next work item that he is qualified to handle.

If work items have been queued (step 303), then the hierarchical remediator 102 initiates remediation (step 309). The initiation of remediation may include examining each queued work item to determine its work item characteristics, such as those characteristics associated with the work items 220, 225 of FIG. 2. Of course, the hierarchical remediator 102, or a similar utility, may alternatively examine the work item characteristics for a work item at any time after the work processing facility becomes aware of the work item (e.g., when the work item arrives in the work processing facility). The hierarchical remediator 102 may also determine if the available server is qualified to perform the task(s) associated with one or more of the queued work items.

The hierarchical remediator 102 determines if the queued work items contain at least one different service class or work type (step 311). If the queued work items are identical in terms of service classes and work types (step 311), then the hierarchical remediator 102 assigns the highest priority work item to the available server if the server is capable of performing the queued work items (step 313). When the queued work items are identical, the hierarchical remediator 102 has no necessity for performing hierarchical remediation. The highest priority work item in such a situation would typically be the work item queued the longest.

If the queued work items contain different work types or service classes (step 311), then the hierarchical remediator 102 selects one of the work items (step 315). The hierarchical remediator 102 generates a composite preference value for the selected work item (step 317). Exemplary procedures associated with generating a composite preference value for a selected work item are discussed with regard to FIGS. 4–7. The hierarchical remediator 102 then determines if any other queued work items remain (step 319). If additional work items remain (step 319), then the hierarchical remediator 102 selects the next work item (step 315) and then generates its composite preference value (step 317).

If no additional work items remain (step 319), then the hierarchical remediator determines which queued work item has the highest composite preference value (step 321). The hierarchical remediator 102 then assigns the available server to the work item having the highest composite preference value (step 323). Depending upon the hierarchical remediator's configuration and upon the configuration of the work processing facility, assigning the available server to the work item may consist merely of recommending to the work processing facility that the assignment should be made while leaving the actual assignment process to the work processing facility itself.

At least one exemplary procedure for generating a composite preference value for a work item entails determining the available server's likes and dislikes with regard to the work type entailed by the work item. The server's preferences (or likes) may represent the service organization's preferences for assigning work of a particular work type to the server. FIG. 4 is a server preference table 400 illustrating the preferences of various servers for various work types 215 that represent various types of work performed in the service organization, according to an embodiment of the invention. Each server in the system has a server ID 401. Each server may theoretically perform work associated with each possible work type 215 identified by the service organization.

Each server has a preference 403 for performing work of a particular work type 215. The magnitude of a preference value represents an affinity for the associated type of work. Each server also has a threshold value 404 that represents the server's reluctance for performing tasks of a particular work type 215. Of course, the server threshold value 404 may comprise a measure of the service organization's reluctance to have the server perform work of a particular work type, instead of (or in addition to) the server's personal reluctance for performing the work type. Accordingly, the server preference table 400 has entries 405–410 corresponding to each server ID 401 and each work type 215. For example, the entry 405 represents the server with server ID 100 preferences with regard to the work type "complaint calls." For this particular work type, the server ID 100 has a preference for the work type of "8" and a threshold for the work type of "9." Normally, a server does not receive work for which the preference value 403 is less than the threshold preference value 404. Accordingly, the server ID 100 would not normally perform tasks associated with "complaint calls." On the other hand, as indicated in entry 406, the server ID 100 would typically perform tasks associated with "claims calls from preferred customers" since the preference value 403 for this work type is "8" while the threshold value 404 is "3."

Work types for which a server is essentially unqualified have no preference value or a preference value of "0." For example, as shown in entry 410, the server ID 101 is not qualified to perform work associated with "Quote Requests." Accordingly, the hierarchical remediator 102 will not assign the server ID 101 to perform work associated with quote request calls.

At least one exemplary procedure for generating a composite preference value for a queued work item entails determining a preference value for a service class incorporated within the work item. Establishing a preference value for a service class incorporated within a work item relates to unsatisfied service level goals within the set of service level goals established by the organization. FIG. 5 is a diagram illustrating a table 500 of unsatisfied service level goals identified by the work processing facility from among a sample set of service level goals, according to an embodiment of the invention. Comparing FIGS. 2 and 5, it can be seen that columns 511–514 in table 500 correspond to the columns 211a,b–214a,b, respectively, for the work items 220, 225. Table 500 also includes two additional columns: an attained service level column 515, and an unsatisfied column 516. The attained service level column 515 indicates, for each goal, the percentage of transactions within the service class of the goal for which the goal criterion was satisfied. For instance, it can be seen that for a goal 503 the attained service level is 92%—that is, of all the calls from preferred customers during the current day, 92% of these calls were not abandoned. The attained service level is also sometimes referred to as "attained performance level." The unsatisfied column 516 indicates whether the goal is unsatisfied based on its attained service level—that is, whether the attained service level is lower than the desired service level. For goal 503, the attained service level is 92% but the desired service level is 95%. As another example, it can be seen that a goal 504 is unsatisfied since its attained service level, 83%, is less than its desired service level, 85%.

After the work processing facility has identified any unsatisfied service level goals, the work processing facility selects each service class having at least one identified goal—that is, each service class having at least one unsatisfied goal. The work processing facility then determines the highest priority level not presently being satisfied for each service class. For example, the service class "calls from prospects" has unmet goals 501, 505 corresponding to priority levels "1" and "5." Accordingly, the highest unmet goal for the "calls from prospects" service class is "1." The work processing facility performs similar processing with regard to the other service classes. Finally, the work processing facility compares the highest unmet goals for each service class with the other service classes to determine a preference level for each service class, e.g., which service class having unmet goals has the highest priority.

FIG. 6 is a diagram of a table 600 illustrating the assignment of preference levels to service classes, according to an embodiment of the invention. It can be seen by comparing FIG. 6 to FIG. 5 that each selected service class shown in FIG. 5 has been assigned the preference level of one of its goals. For example, it can be seen that the calls from preferred customer service class 602, shown as selected in FIG. 5, has been assigned preference level 2, which is assigned to the goal 503, which has the calls from preferred customer service class. Higher priority preference levels receive higher values for their preference levels, while lower priority preference levels receive lower values.

The service class preference levels shown in FIG. 6 may be used by the hierarchical remediator 102 in the generation of the composite preference value so as to bias the assignment of work items containing this service class. For example, the hierarchical remediator 102 could apply a heavier bias for assigning server resources to handling transactions within the calls from prospects service class than to handling transactions within the calls from preferred customers or fulfillment processing service classes. On the other hand, the bias toward assigning additional server resources to handling transactions within the fulfillment processing service class would only be stronger than any bias toward assigning server resources to transactions within service classes whose goals are being satisfied.

An exemplary method and system for establishing a preference value for a service class incorporating a work item is disclosed in U.S. patent application Ser. No. 09/149, 877, "Dynamically Assigning Priorities for the Allocation of Server Resources to Competing Classes of Work Based Upon Achievement of Service Level Goals," filed on Sep. 8, 1998, assigned to the Mosaix Corporation, and which is incorporated herein by reference.

Figure 7:
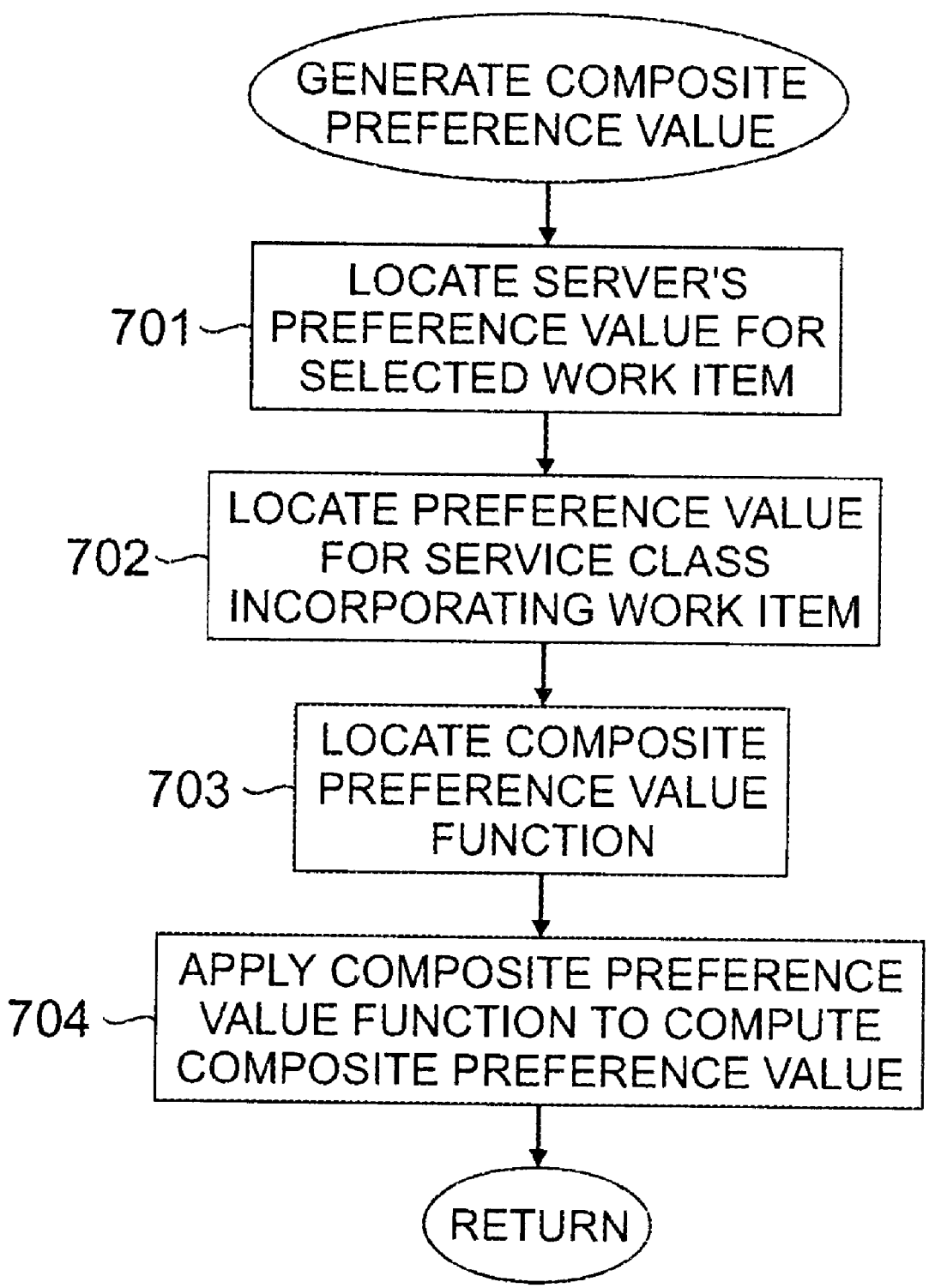
FIG. 7 is a flowchart illustrating the generation of composite values using the hierarchical remediator 102 or a similar facility, according to an embodiment of the invention.

FIG. 7 is a flowchart illustrating the generation of composite preference values using the hierarchical remediator 102 or its corresponding method, according to an embodiment of the invention.

The hierarchical remediator 102 locates a server's preference value for a queued work item (step 701). The hierarchical remediator 102 determines the work type of the work item, and ascribes the server's preference value for the work type to the server's preference value for the work item.

Assume that the available server is the server ID 100 shown in the server preference table 400 of FIG. 4 and that the queued work items are the work items 220 and 225 shown in FIG. 2. According to table 400, the server ID 100 has a preference value for the work type "claims calls from preferred customers" of "8" and a preference value for the work type "quote requests" of "2." Accordingly, the hierarchical remediator 102 would ascribe the server's preference value of "8" for the work type "claims calls from preferred customers" to the server's preference value for the work item 220. Similarly, the hierarchical remediator 102 would ascribe the server's preference value of "2" for the work type "quote requests" to the server's preference value for the work item 225.

In some instances, the hierarchical remediator 102 may determine that a work item contains more than one work type. In such a case the hierarchical remediator 102 may utilize a number of functions to determine a server's preference value for a selected work item. For example, the hierarchical remediator 102 may locate the maximum value for the server's preferences from among the work types within the queued work item. In the alternative, the hierarchical remediator 102 may sum all of a server's work type preferences for a work item. One skilled in the art can readily identify many other possible functions for identifying a server's preference value for a selected work item.

Figure 8:
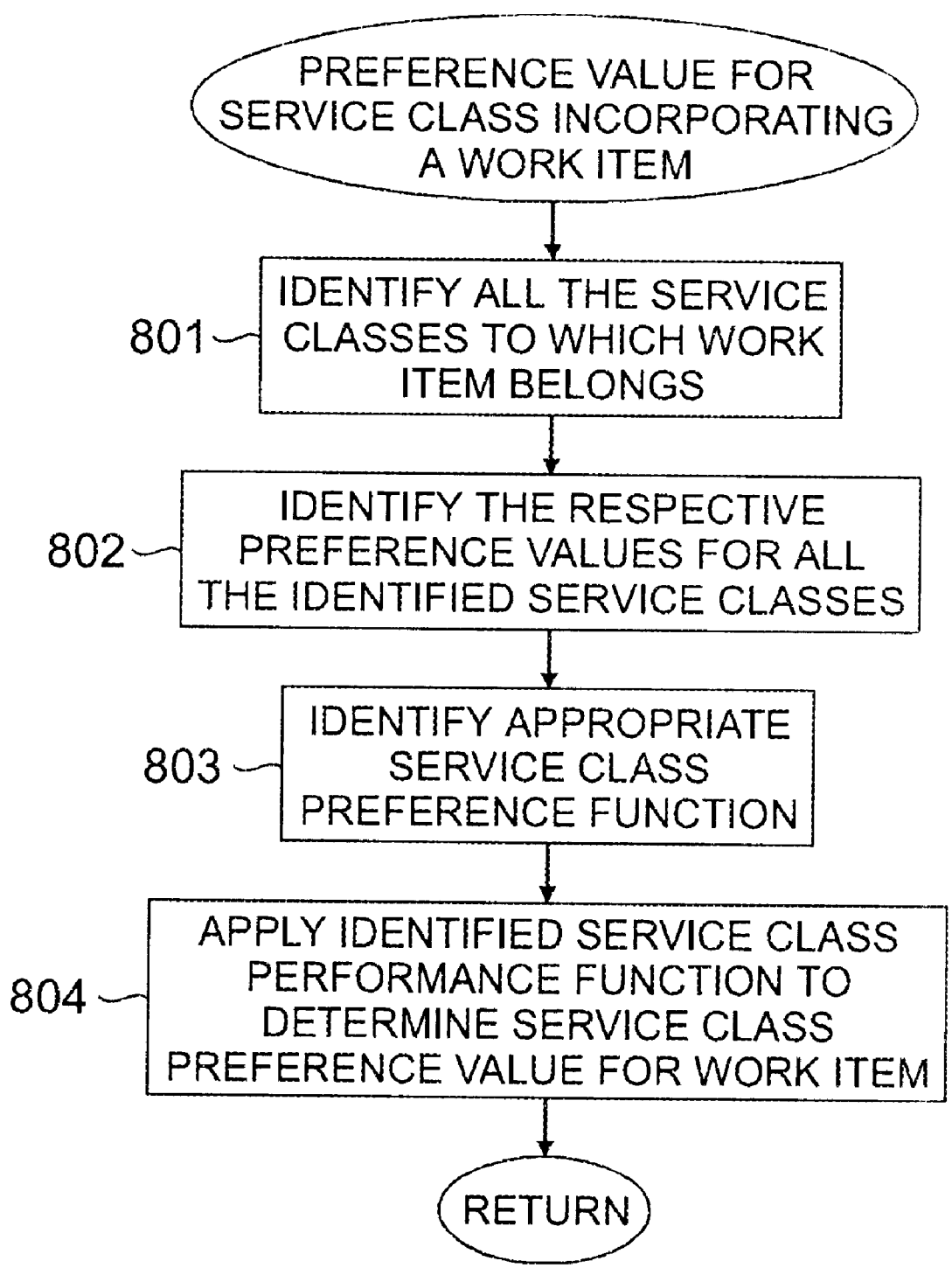
FIG. 8 is a flowchart illustrating the determination of the preference value for a work item based on service class membership, according to an exemplary embodiment of the invention.

The hierarchical remediator 102 locates the preference value based on the service classes incorporating the work item (step 702). A number of functions may be utilized in determining the service class preference value of a work item. For example, the hierarchical remediator 102 may locate the maximum preference level for the service classes to which a work item belongs. Assume that the work item is the work item 220 shown in FIG. 2. Assume further that the current preference levels for service classes are those shown in the table 600 (FIG. 6) and that the service class "claims calls" has no preference value (e.g., this service class presently achieves its goals). If the function for determining a preference value for the service classes incorporating the work item is based upon the maximum preference level for the service classes within the work item, then the work item 220 would have a preference value of "2" based upon comparison of FIGS. 2 and 6 because "calls from preferred customers" has the highest level. (FIG. 8 provides additional detail regarding an exemplary method for determining the preference value for service classes incorporating a work item.)

In the alternative, the hierarchical remediator 102 may sum the preference levels of the service classes within a work item. One skilled in the art can readily identify other possible mechanisms for determining the service class preference value of a work item.

The hierarchical remediator 102 locates the composite preference value function presently selected within the work processing facility (step 703). As previously discussed, an embodiment of the hierarchical remediator 102 allows for user selection of various parameters, such as the composite preference value function. At various times, facility management, for example, may determine that one composite preference value function is preferable to another.

An exemplary composite preference value function might comprise adding the server's preference value for a queued work item (from step 701) with the preference value based on service classes incorporating the work item (from step 702). Another exemplary composite preference value function might comprise multiplying the server's preference value for a queued work item (from step 701) with the preference value for the service classes incorporating the work item (from step 702). Yet another exemplary composite preference value function might comprise adding server's preference value for a queued work item (from step 701) weighted according to another parameter with the preference value for the service classes incorporating the work item (from step 702) also weighted according to another parameter.

Regardless of the composite value function selected, the hierarchical remediator 102 applies the composite preference value function using as inputs the server's preference for the work item and the service class preference for the work item in order to compute the composite preference value (step 704).

FIG. 8 is a flowchart illustrating the determination of the preference value for a work item based on service class membership suitable for use in conjunction with step 702 of FIG. 7, according to an exemplary embodiment of the invention. The hierarchical remediator 102 identifies all the service classes to which a work item belongs (step 801). The hierarchical remediator 102 then identifies the respective preference levels for all the identified service classes to which the work item belongs (step 802), such as the preference levels shown in FIG. 6.

The hierarchical remediator 102 next identifies an appropriate service class preference function (step 803). As discussed above, the hierarchical remediator 102 may allow for user selection of a variety of parameters. An appropriate service class preference function may consist of selecting the highest preference level from among all of the identified service classes. One skilled in the art may readily recognize other preference value functions.

The hierarchical remediator 102 applies the selected service class preference function to determine the service class preference value for a work item (step 804).

Figure 9:
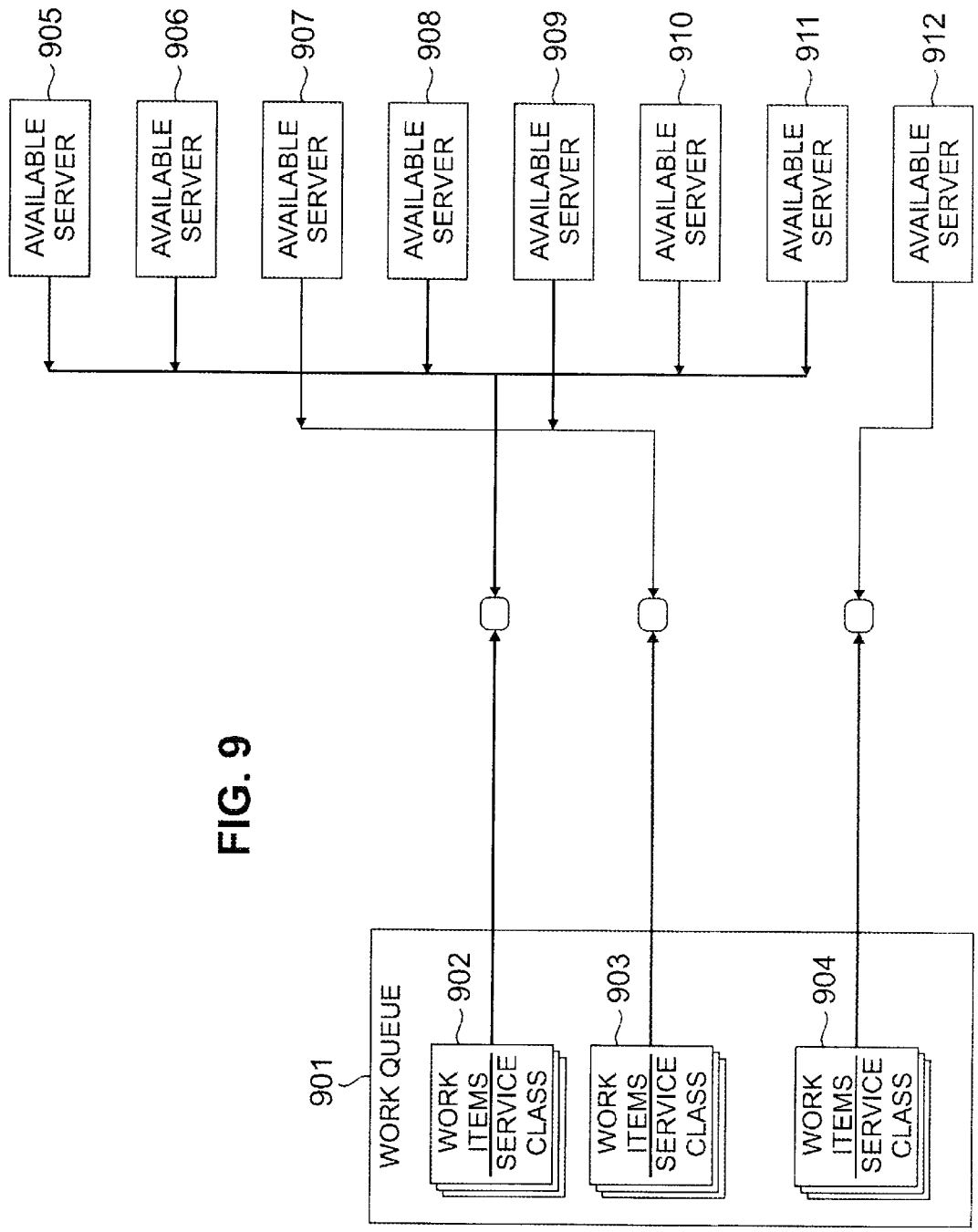
FIG. 9 illustrates how the use of hierarchical remediation dynamically biases the assignment of available servers to work items in a work queue 901, according to an embodiment of the invention.

FIG. 9 illustrates how hierarchical remediation dynamically biases the assignment of available servers to work items in a work queue 901, according to an embodiment of the invention. The work queue 901 contains multiple instances of three different work items in work item sets 902–904. Each of the work item sets 902–904 represent one or more different service classes and work types. In other words, the work item sets 902–904 have at least one service class or work type different from each other, For purposes of illustration, one can also assume that at least one service class contained in the work item sets 902–904 represents a different presently unfilled goal within the system. One may further assume that the work item set 902 more often has a higher composite preference value than the work item set 903, which in turn more often has a higher composite preference value than the work item set 904. Available servers 905–912 represent servers that become available within the work processing facility within a given time interval. Because of the dynamic bias applied through hierarchical remediation, more servers (the available servers 905–906, 908, 910–911) are applied to work items of the work item set 902 than are applied to work items of the work item set 903 (the available servers 907 and 909) and to work items of the work item set 904 (the available server 912).

Figure 10B:
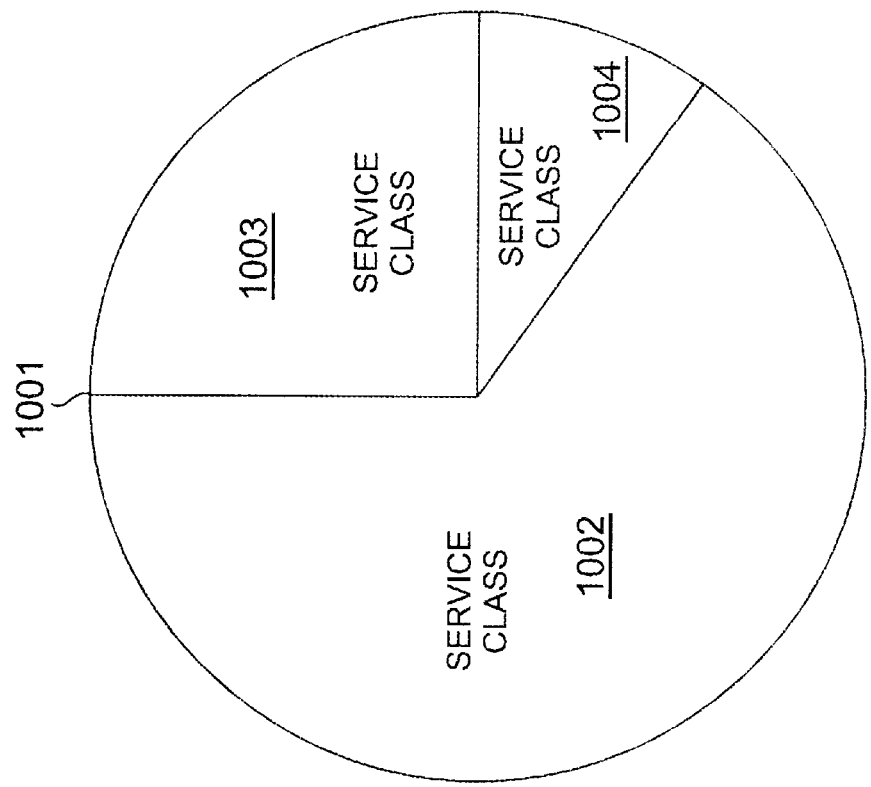
FIGS. 10A and 10B illustrate a pie chart 1001 that shows the change in assignment of servers to various service classes 1002–1004 over time due to hierarchical remediation, according to an embodiment of the invention.
Figure 10A:
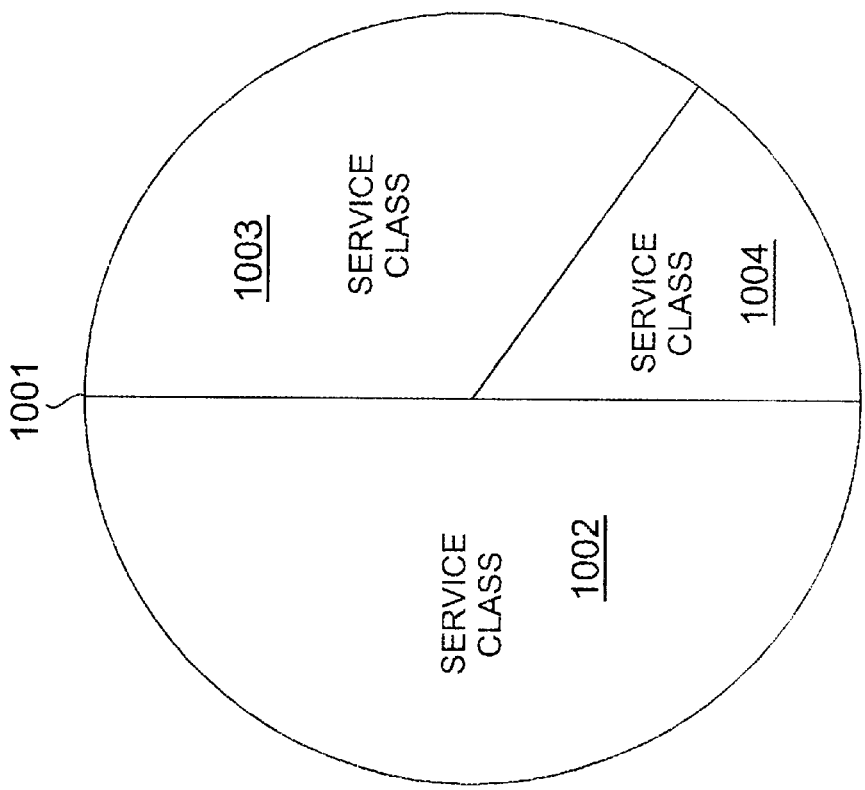

FIGS. 10A and 10B illustrate a pie chart 1001 that shows the change in the effective assignment of servers to various service classes 1002–1004 over time due to hierarchical remediation, according to an embodiment of the invention. For purposes of illustration with all other things being equal, one can assume that the service class 1002 has a higher average composite preference value than the service class 1003 which in turn has a higher average composite preference value than the service class 1004. Neither service classes nor work types have composite preference values without regard to the servers. However, one could say that the weighted average composite preference values were larger or smaller, for example. The weighting might depend upon the traffic for the different work types and the number of servers with dominant preferences for the different kinds of work types and the handling times for each of the different work types.

Because of unmet needs in the work processing facility, hierarchical remediation applies a dynamic bias to the assignment of servers, which over time changes the application of servers from the pie chart 1001 shown in FIG. 10A to the pie chart 1001 shown in FIG. 10B. In FIG. 10B, the service class 1002 occupies a greater proportion of the assigned servers than the service class 1002 occupies in FIG. 10A. Because the hierarchical remediator 102 applies more servers of a limited server pool to the service class 1002, the hierarchical remediator assigns fewer servers to the service class 1004. Likewise, the number of servers in the service class 1003 also decreases, although not as greatly as the number of servers in the service class 1004 due to the higher composite preference value of the service class 1003 relative to the service class 1004.

The present invention may also operate in conjunction with a method and system for adjusting the availability of servers for performing various types of work. An exemplary method and system for adjusting the availability of servers for performing various types of work is disclosed in U.S. patent application Ser. No. 09/247,893, "Dynamically Allocating Server Resources to Competing Classes of Work Based Upon Achievement of Service Level Goals," filed on Feb. 10, 1999, assigned to the Mosaix Corporation, and which is incorporated herein by reference.

As discussed above, the invention provides a facility for performing hierarchical remediation associated with work items queued in a work processing facility. Of course, one skilled in the art will recognize that the work items do not need to be queued in a conventional queue and that the invention requires no particular topology with regard to the queued items. As used herein, the term "queued" simply refers to a work item held pending distribution.

While this invention has been shown and described with references to preferred embodiments, it will be understood by those skilled in the art that various changes or modifications in form and detail may be made without departing from the scope of the invention. For example, the preference values utilized by the hierarchical remediator may be used to assign resources of all types. Further, preference values that are not contiguous integers may be assigned by the hierarchical remediator, as may be non-numeric service levels. For example, the criteria for meeting good or bad service on a particular work type could avoid the use of integer or decimal numbers by using instead a Boolean function of transaction attributes or even some form of alphanumeric indicators, e.g., A1>C3.

The invention is also applicable to work items that may be described as having only one of a work type and/or a service class. In this embodiment, the distinction between work types and service classes vanishes. This embodiment otherwise operates in a similar manner to the embodiments described herein, e.g., the server's preference may refer to service classes in a work item.

In addition, while the examples discussed above relate to calls in a call center, the invention is not limited to the processing of calls in a call center by servers, both human and/or robotic. The invention may be applied to the servicing of any form of work type and any form of service class. For example, the invention is equally applicable to the processing of electronic mail messages and video streaming tasks.

These and other changes can be made to the invention in light of the above detailed description. In general, in the following claims, the terms used should not be construed to limit the invention to the specific embodiments disclosed in the specification and the claims, but should be construed to include all hierarchical remediation methods and systems that operate in accordance with the invention. Accordingly, the invention is not limited by the disclosure, but instead its scope is to be determined by the following claims.

We claim:

1. A method in a computer system for assigning a server to a work item of a plurality of work items, each of the plurality of work items corresponding to a plurality of service classes and each work item and corresponding service class being related to a respective client, comprising:

selecting each work item of the plurality of work items;

determining a corresponding server's preference value for each selected work item, at least two of the plurality of work items having differing server preference values;

determining, for each selected work item, a corresponding preference value for at least one service class incorporated within the selected work item;

providing, for each selected work item, a user-selectable composite preference value function that is useable to generate a composite preference value corresponding to the selected work item;

providing, for each selected work item, the determined server's preference value for the selected work item and the determined preference value for the at least one service class incorporated within the selected work item to the user-selectable composite preference value function to generate the composite preference value for the at least one work item;

determining which work item of the plurality of work items has the highest composite preference value; and assigning the server to the work item determined to have the highest composite preference value.

2. The method of claim 1, further comprising selecting the user-selectable composite preference value function during an initialization procedure by one of a default selector or a user.

3. The method of claim 1 wherein determining the server's preference value for the selected work item, comprises:

examining the selected work item to identify at least one corresponding work type for the selected work item; and locating the server's preference values for the identified at least one corresponding work type.

4. The method of claim 3, further comprising assigning the server to a work item of the plurality of work items having a highest priority if the plurality of work items contain at least one of the same service classes and the same work type.

5. The method of claim 4, further comprising:
providing the server's preference value for the identified corresponding work type as the server's preference value for the selected work item.

6. The method of claim 4 wherein the selected work item has at least another corresponding work type such that the at least one corresponding work type and the at least another corresponding work type are elements of an identified set of work types for the selected work item, the method further comprising:
for each work type of the identified set of work types, identifying the server's preference value for the work type;
providing a user-selectable server preference function that is useable to generate a server preference value; and
providing the server's preference values for the identified set of work types to the user-selectable server preference function to determine the server's preference value for the selected work item.

7. The method of claim 6 wherein if a work type of the identified set of work types does not have a preference in the server's preferences, then the work item is withdrawn from a server queue.

8. The method of claim 6 wherein the user-selectable server preference function comprises:
determining which work type of the identified set of work types has the highest server's preference value; and
selecting the work type determined to have the highest server's preference value as the server's preference value for the selected work item.

9. The method of claim 6 wherein the user-selectable server preference function comprises:
calculating an average of server's preference values for the work type of the identified set of work types; and
selecting the average as the server's preference value for the selected work item.

10. The method of claim 1 wherein determining the server's preference value for the selected work item comprises:
examining the selected work item to identify a corresponding set of work characteristics associated with the selected work item;
locating the server's preference values for the corresponding identified set of work characteristics;
for each work characteristic of the corresponding identified set of work characteristics, identifying the server's preference value for the work characteristic;
providing a user-selectable server preference function that is useable to generate a server preference value; and
providing the server's preference values for the corresponding identified set of work characteristics to the user-selectable server preference function to determine the server's preference value for the selected work item.

11. The method of claim 1 wherein determining the preference value for the corresponding at least one service class incorporated within the selected work item, comprises:
examining the selected work item to identify the corresponding service classes incorporated within the selected work item;
determining preference levels for the corresponding identified service classes, wherein the preference levels reflect a prioritization of unmet needs;
providing a user-selectable service class preference function useable to generate a preference value for a service class incorporated in a work item; and
providing the determined preference levels to the user-selectable service class preference function and applying the user-selectable service class preference function to determine the preference value for at least one of the corresponding service classes incorporated within the selected work item.

12. The method of claim 11 wherein the prioritization of unmet needs of the preference levels includes at least one of present needs and predicted future unmet needs.

13. The method of claim 11 wherein the unmet needs comprise at least one of service levels, service measures, average performance, and designated remediation subjects.

14. The method of claim 11 wherein if a preference level for one of the identified work types for the server cannot be located, then the work type for the server is withdrawn from a server queue.

15. The method of claim 11 wherein the user class preference function comprises:
determining which preference level of the determined preference levels for the identified service classes has a highest preference value; and
selecting the highest preference value of the preference level determined to have the highest preference value as the preference value for the corresponding at least one service class incorporated within the selected work item.

16. The method of claim 11 wherein the user-selectable service class preference function comprises:
calculating an average for the determined preference levels for the identified service classes corresponding to the selected work item; and
selecting the average for the determined preference levels as the preference value for the at least one service class incorporated within the selected work item.

17. The method of claim 1 wherein the server is one of a human agent or a robotic agent and the user-selectable preference function is configured to operate with one of human agent data or robotic agent data.

18. The method of claim 1 wherein the plurality of work items pertain to tasks performed within a call center and the user-selectable preference function is configured to operate with call center data.

19. The method of claim 1 wherein the user-selectable preference function is configured for operations within an application-specific integrated circuit ("ASIC").

20. The method of claim 1 wherein the user-selectable preference function is configured for operations within an automatic call distributor ("ACD") in a call center.

21. The method of claim 1, further comprising assigning the server to the selected work item if the server is qualified to perform tasks associated with only the selected work item of the plurality of work items.

22. The method of claim 1, further comprising not assigning the server to a work item if the server is not qualified to perform tasks associated with any work item of the plurality of work items.

23. A method for generating a composite preference value for at least one work item of a plurality of work items with respect to a server in a work processing facility, the method comprising:

determining the server's preference value for the at least one work item, at least two of the work items having differing server preference values;

determining the preference value for a service class incorporated within the at least one work item, the at least one work item and corresponding service class being related to a respective client;

providing a user-selectable composite preference value function that is useable to generate a composite preference value; and providing the determined server's preference value for the at least one work item and the determined preference value for the service class incorporated within the at least one work item to the user-selectable composite preference value function to generate the composite preference value for the at least one work item.

24. The method of claim 23, further comprising:

providing the composite preference value to at least one of a hierarchical remediator, an automatic call distributor ("ACD"), or work distributor that assigns a work item of the plurality of work items to the server based on the composite preference value.

25. The method of claim 23 wherein determining the server's preference value for the at least one work item, comprises:

examining the at least one work item to identify at least one work type for the at least one work item; and locating the server's preference values for the identified at least one work type.

26. The method of claim 25, further comprising:

providing the server's preference value for the identified work type as the server's preference value for the at least one work item.

27. The method of claim 25 wherein the at least one work item has at least another work type such that the at least one work type and the at least another work type comprise an identified set of work types, the method further comprising:

for each work type of the identified set of work types, identifying the server's preference value for the work type;

providing a user-selectable server preference function that is useable to generate a server preference value; and providing the server's preference values for the identified set of work types to the user-selectable server preference function to determine the server's preference value for the at least one work item.

28. The method of claim 27 wherein the user-selectable preference function comprises:

determining which work type of the identified set of work types has a highest preference value; and selecting the work type determined to have the highest preference value as the server's preference value for the at least one work item.

29. The method of claim 27 wherein the user-selectable preference function comprises:

calculating an average of the preference values for the identified set of work types; and selecting the average for the identified set of work types as the server's preference value for the at least one work item.

30. The method of claim 25 wherein if a preference value for a work type of the identified set of work types cannot be located, then the work type is withdrawn.

31. The method of claim 23 wherein determining the preference value for the at least one service class incorporated within the at least one work item, comprises:

examining the at least one work item to identify a set of service classes incorporated within the at least one work item;

determining preference levels for the identified set of service classes, wherein the preference levels reflect a prioritization of unmet needs;

providing a user-selectable service class preference function useable to generate a preference value for service classes incorporated in a work item; and providing the determined preference levels to the user-selectable service class preference function and applying the user-selectable service class preference function to determine the preference value for the at least one service class incorporated within the at least one work item.

32. The method of claim 31 wherein if a preference level for one of the identified service classes cannot be located, then the service class is withdrawn.

33. The method of claim 31 wherein the user-selectable service class preference function comprises:

determining which preference level of the determined preference levels for the identified service classes has the highest preference level; and selecting the value of the highest preference level as the preference value for the at least one service class incorporated within the at least one work item.

34. The method of claim 31 wherein the user-selectable service class preference function comprises:

calculating an average for the determined preference levels for the identified service classes; and selecting the average for the identified preference levels as the preference value for a service class incorporated within the at least one work item.

35. The method of claim 23 wherein the server is one of a human agent or a robotic agent and the user-selectable preference function is configured to operate with at least one of human agent data or robotic agent data.

36. The method of claim 23 wherein the plurality of work items pertain to tasks performed within a call center and the user-selectable preference function is configured to operate with call center data.

37. The method of claim 23 wherein the plurality of work items pertain to tasks performed within a work processing facility automated with a work flow system and the user-selectable preference function is configured to operate with data from the work flow system.

38. A system for assigning a server to a work item of a plurality of work items in a work processing facility, comprising:

a work examiner that selects each work item of the plurality of work items and generates a composite preference value for the work item;

a preference value comparator that receives the generated composite preference values from the work examiner and determines which work item of the plurality of work items has the highest composite preference value;

a work assignor that assigns the server to the work item determined by the preference value comparator to have the highest composite preference value; and a composite preference calculator used by the work examiner to generate the composite preference value for the work item, the composite preference calculator comprising:

a server preference examiner that examines the server's preference value for the work item, at least two of the work items having differing server preference values;

a service class examiner that examines a preference value for a service class incorporated within the work item, the work item and corresponding service class being related to a respective client;

a function provider that provides a user-selectable composite preference value function that is useable to generate a composite preference value; and a processor that receives the server's preference value for the work item from the server preference examiner and receives the examined preference value for the service class incorporated within the work item from the service class examiner, and applies the examined server's preference value for the work item and the examined preference value for the service class incorporated within the work item as inputs to the provided user-selectable composite preference value function to generate the composite preference value for the work item.

39. The system of claim 38 wherein the server preference examiner comprises:

a work item examiner that examines the work item to identify a set of work types associated with the work item;

a preference provider that provides the server's preference values for the identified set of work types;

a preference examiner that identifies the server's preference value for the set of work types by examining each work type of the identified set of work types;

another function provider that provides a user-selectable server preference function; and a processor that receives the server's preference values for the set of work types from the preference examiner and applies the user-selectable server preference function to determine the server's preference value for the work item.

40. The system of claim 39 wherein the set of work types contains one work type.

41. The system of claim 39 wherein the server preference examiner is configured to designate the work type as withdrawn if the preference examiner cannot locate a preference value for the work type of the identified set of work types.

42. The system of claim 39 wherein the processor in applying the user-selectable server preference function is configured to determine which work type of the identified set of work types has a highest preference value and to select the preference value of the work type having the highest preference value as the server's preference value for the item.

43. The system of claim 39 wherein the processor in applying the user-selectable server preference function is configured to calculate an average preference of server's preference values for the work types of the identified set of work types and to select the average as the server's preference value for the work item.

44. The system of claim 38 wherein the service class examiner comprises:

a work item examiner that examines the work item to identify a set of service classes associated with the work item;

a preference determiner that determines preference levels for the identified set of service classes, wherein the preference levels reflect a prioritization of unmet needs;

another function provider that locates a user-selectable service class preference function; and a processor that receives the determined preference levels from the preference determiner and applies the determined preference levels as inputs to the user-selectable service class preference function to determine the preference value for a service class incorporated within the work item.

45. The system of claim 44 wherein the unmet needs comprise at least one of service levels, service measures, average performance, and designated remediation subjects.

46. The system of claim 44 wherein the preference determiner is configured to designate the service class as withdrawn if preference determiner cannot locate a preference level for one of the identified service classes.

47. The system of claim 44 wherein the processor in applying the user-selectable service class preference function is configured to determine which preference level of the determined preference levels in the identified service classes has a highest preference value and to select the highest preference value of the preference level determined to have the highest preference value as the preference value for the service class incorporated within the work item.

48. The system of claim 44 wherein the processor in applying the user-selectable service class preference function is configured to calculate an average for the determined preference levels for the identified service classes and to select the average for the determined preference levels as the preference value for the service class incorporated within the work item.

49. The system of claim 38 wherein the server is one of a human agent or a robotic agent and the user-selectable preference function is configured to operate with at least one of human agent data or robotic agent data.

50. The system of claim 38 wherein the plurality of work items pertain to tasks performed within a call center and the user-selectable preference function is configured to operate with call center data.

51. The system of claim 38 wherein the user-selectable preference function is configured for operations within an application-specific integrated circuit.

52. The system of claim 38 wherein the user-selectable preference function is configured for operations within an automatic call distributor ("ACD") in a call center.

53. The system of claim 38 wherein the work examiner is configured to send an indication that the server should be assigned to a work item of the plurality of work items having a highest priority if the plurality of work items contain at least one of the same service classes or the same work types.

54. The system of claim 38 wherein the work examiner is configured to send an indication that the server should be assigned to the one work item if the server is qualified to perform tasks associated with only one work item of the plurality of work items.

55. The system of claim 38 wherein the work examiner is configured to send an indication that the server should not be assigned to a work item if the server is not qualified to perform tasks associated with any work item of the plurality of work items.

56. A system for generating a composite preference value for at least one work item of a plurality of work items with respect to a server in a work processing facility, the system comprising:

a server preference examiner that examines the server's preference value for the at least one work item;

a service class examiner that examines the preference value for a service class incorporated within the at least one work item, the at least one work item and corresponding service class being associated with a client and at least two of the work items having differing server preference values;

a function provider that provides a user-selectable composite preference value function that is useable to determine a composite preference value; and a processor that receives the examined server preference value for the at least one work item from the service class examiner and receives the examined preference value for the service class incorporated within the at least one work item from the service class examiner and applies the examined server preference value for the at least one work item and the examined preference value for a service class incorporated within the at least one work item as inputs to the provided user-selectable composite preference value function to generate the composite preference value for the at least one work item.

57. The system of claim 56 wherein the server preference examiner comprises:

a work item examiner that examines the at least one work item to identify a set of work types associated with the at least one work item;

a preference provider that provides the server's preferences for the identified set of work types;

a preference examiner that identifies the server's preference value for each work type by examining the identified set of work types;

another function provider that provides a user-selectable server preference function; and a processor that receives the server's preference values for the set of work types from the preference examiner and applies the user-selectable server preference function to determine the server's preference value for the at least one work item.

58. The system of claim 57 wherein the processor in executing the user-selectable preference function is configured to calculate an average for the identified set of work types and select the average for the identified work types as the server's preference value for the at least one work item.

59. The system of claim 57 wherein the identified set of work types contains one work type.

60. The system of claim 57 wherein the preference examiner is configured to designate the work item as withdrawn with regard to further calculations of the preference value comparator if the preference examiner cannot locate a preference value for a work type of the identified set of work types.

61. The system of claim 57 wherein the processor in executing the user-selectable preference function is configured to determine which work type of the identified set of work types has a highest preference value and to select the work type having the highest preference value as the server's preference value for the at least one work item.

62. The system of claim 56 wherein the service class examiner comprises:

a work item examiner that examines the at least one work item to identify service classes associated with the at least one work item;

a preference determiner that determines preference levels for the identified service classes, wherein the preference levels reflect a prioritization of unmet needs;

a function provider that provides a user-selectable service class preference function; and a processor that receives the determined preference levels from the preference determiner and applies the determined preference levels as inputs to the user-selectable service class preference function to determine the preference value for a service class incorporated within the at least one work item.

63. The system of claim 62 wherein if the preference determiner cannot locate a preference level for one of the identified service classes, then the preference determiner marks the service class as withdrawn.

64. The system of claim 62 wherein the processor in executing the user-selectable service class preference function is configured to determine which preference level of the identified preference levels has the highest preference and to select a value of the highest preference level as the preference value for a service class incorporated within the at least one work item.

65. The system of claim 62 wherein the processor in executing the user-selectable service class preference function is configured to calculate an average for the identified preference levels and select the average for the identified preference levels as the preference value for a service class incorporated within the at least one work item.

66. The system of claim 56 wherein the server is one of a human agent or a robotic agent.

67. The system of claim 56 wherein the plurality of work items pertains to tasks performed within a call center.

68. The system of claim 56 wherein the system is configured for operations within an application-specific integrated circuit.

69. The system of claim 56 wherein the system is configured for operations within an automatic call distributor in a call center.

70. The system of claim 56 wherein the system is configured for operations with a work flow automation system.

71. A computer-readable medium whose contents cause a computer system to assign a server to a work item of a plurality of work items in a server queue by performing the steps of:

assigning a server preference value to each work item of the plurality of work items;

when a work item does not have a corresponding server preference value or when the server preference value corresponding to a work item is deemed to be unimportant, removing the work item from the server queue;

selecting each remaining work item of the plurality of work items and generating a composite preference value for the remaining work item, the composite preference value for each of the remaining work items being a function of the server preference value assigned to each respective work item;

determining which remaining work item of the plurality of remaining work items has the highest composite preference value; and assigning the server to the remaining work item determined to have the highest composite preference value.

72. The computer-readable medium of claim 71 further comprising:

determining a service class preference value for a service class incorporated within each work item, the work item and the associated service class corresponding to a client; and wherein the composite preference value for each of the remaining work items is also a function of the service class preference value for the service class associated with the work item.

73. A computer-readable medium whose contents cause a computer system to generate a composite preference value for each work item of a plurality of work items with respect to a server in a work processing facility by performing the steps of:

determining the server's preference value for each work item, at least two of the work items having differing server preference values;

determining the preference value for a service class incorporated within each work item, the work item and the associated service class corresponding to a client;

locating a user-selectable composite preference value function; and providing the determined server preference value for the at least one work item and the determined preference value for a service class incorporated within the at least one work item to the user-selectable composite preference value function to generate the composite preference value for the at least one work item.

74. The computer-readable medium of claim 73 further comprising:

when a work item does not have a corresponding server preference value or when the server preference value corresponding to a work item is deemed to be unimportant, removing the work item from a server queue associated with the server.

* * * * *